C. L. NICHOLS.
FISHING TOOL.
APPLICATION FILED NOV. 13, 1918.
1,294,940.
Patented Feb. 18, 1919.
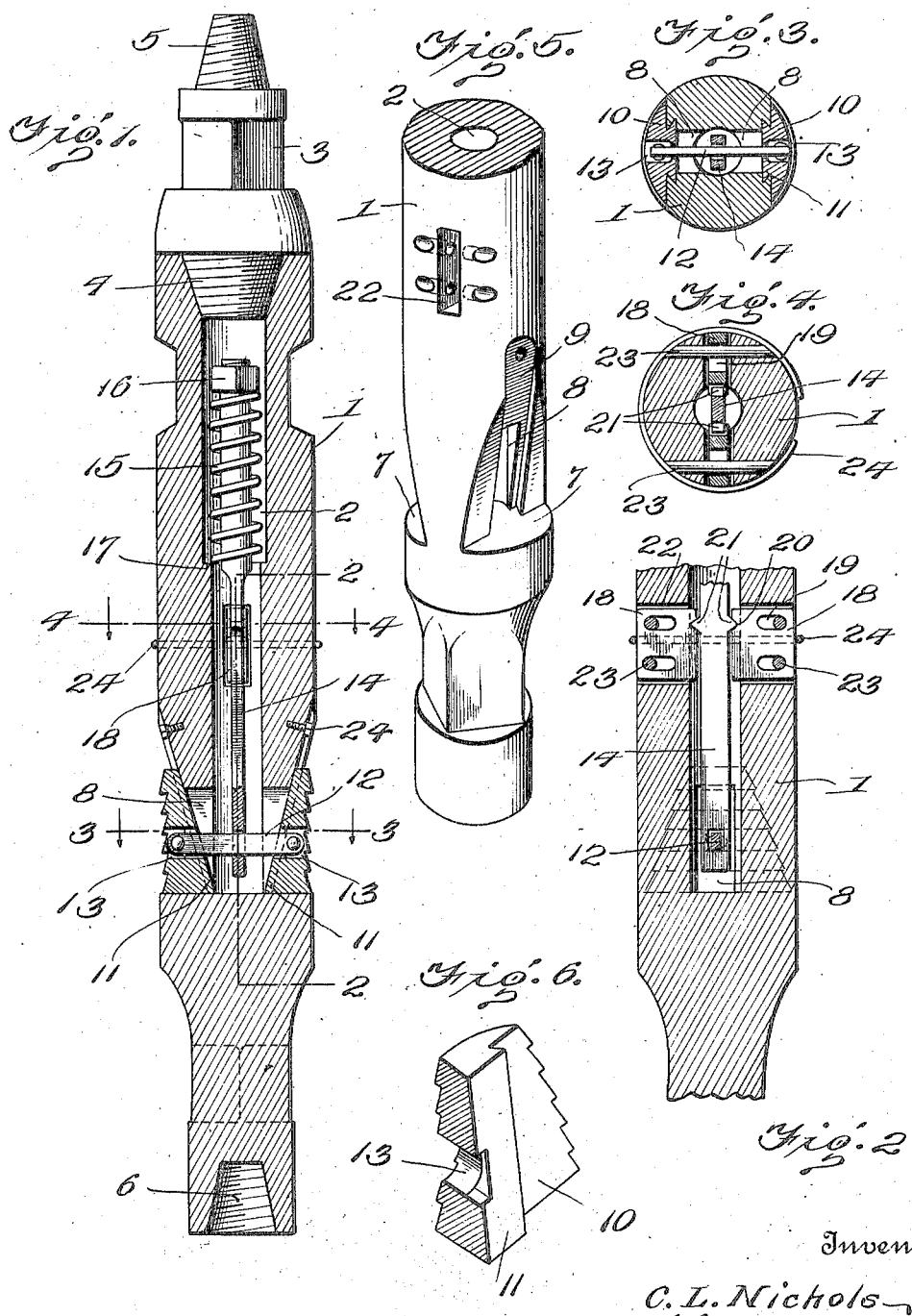

UNITED STATES PATENT OFFICE.

CLARENCE LAMONT NICHOLS, OF RANDLETT, OKLAHOMA.

FISHING-TOOL.

1,294,940.

Specification of Letters Patent.

Patented Feb. 18, 1919.

Application filed November 13, 1918. Serial No. 262,352.

*To all whom it may concern:*

Be it known that I, CLARENCE L. NICHOLS, a citizen of the United States, and a resident of Randlett, in the county of Cotton and State of Oklahoma, have invented certain new and useful Improvements in Fishing-Tools, of which the following is a specification.

My invention is an improvement in fishing tools, and the invention has for its object to provide a tool of the character specified especially adapted for permitting a detached joint to be firmly connected with the remainder of the casing, in such manner that the entire casing may be pulled without the necessity of releasing the detached joint until the said joint is withdrawn.

In the drawings:

Figure 1 is a longitudinal section of the improved tool;

Figs. 2, 3 and 4 are sections on the lines 2—2, 3—3 and 4—4, respectively, of Fig. 1, Figs. 3 and 4 looking in the direction of the arrows adjacent to the line;

Fig. 5 is a perspective view of the lower end of the tool, with the dogs removed; and Fig. 6 is a partial perspective view of one of the dogs.

In the present embodiment of the invention, a body or casing 1 is provided which is cored at its upper end as indicated at 2, and a connector or coupler 3 is connected with the upper end of the body, the upper end of the cored portion or chamber 2 being tapered and threaded as shown, to receive the tapered threaded stem 4 at the lower end of the coupling, and the said coupling has a threaded stem 5 at its upper end for connection with operating mechanism.

The body has an internally threaded tapering recess 6 at its lower end for connection with the casing below the tool. Near its lower end the body has oppositely arranged cut away portions 7, formed by cutting away the material of the body on a slant from above downward and inward, forming a square shoulder at the bottom of each cut away portion.

An opening 8 connects the cut away portions at the shoulders, and on the inclined face of each cut away portion there is a vertical groove 9 which has undercut side walls. The dogs 10, which are shaped to fit these cut away portions and to fill the said portions when the lower ends of the dogs rest on the square shoulders, have undercut ribs 11 on their inner faces which slide in the grooves 8, thus connecting the dogs slidably to the block.

Each dog has teeth on its outer face, as shown, and when the dogs are in the position of Fig. 1 the highest portions of the teeth are within the periphery of the body. The two dogs are connected by a key 12, which extends through the opening 8 and is pinned to each dog by means of a pin as shown, the dogs having transverse openings 13 through which the ends of the key extend. The central portion of the key passes through an opening in a vertically movable link 14 in the chamber 2 of the body, and the upper end of the rod or link is cylindrical and is encircled by a coil spring 15, which bears at its upper end against a stop 16 on the rod, the said stop being in the form of a nut and at its lower end bears against an annular shoulder 17 formed by enlarging the upper end of the cored portion of the chamber. The spring acts normally to force the rod and the dogs upwardly, and this rod has mechanism coöperating therewith to hold the dogs in the position of Fig. 1. The said mechanism comprises retainer plates 18, one of which is arranged at each side of the rod or link, the said plates having parallel slots which are engaged by the keys 19 extending through the body. Each retaining plate has a notch 20 in its inner edge, and the link 14 has cam shaped projections 21 which are adapted to engage the notches when the retainers are in the position of Fig. 2. These retaining plates move in slots 22 in the body, and screws 23 are engaged with openings at the upper ends of the grooves 9 to prevent entire displacement of the dogs upwardly.

In operation, should a casing joint become detached for any reason a casing spear of ordinary construction is connected with the lower end of the tool, at the threaded depression 6, and the tool is lowered through the casing until the casing spear engages within the detached section. After the detached section is caught by the spear, the tool and the casing are lifted until the dogs 10 are within the lower end of the casing, that is, within the section adjacent to the detached section. The dogs will now engage with the casing section and will prevent the detached section and the tool from passing down, that is, the tool locks the detached section firmly to the well casing. Hence the device is a coupler since it will recouple a joint or casing that is loose. After the joints are coupled, the drilling line may be cut, pulled out of the hole and the casing may be pulled in the regular order.

As is known, in the ordinary course of events, after the detached section had been caught by the casing spear, it could not be pulled through the rest of the casing because the said casing is the same size as the detached section. It will be necessary to do what is called a stripping job to rectify matters, that is, the entire casing would have to be pulled, each joint being detached as it came above the ground surface, and each time the casing is lifted the detached joint would necessarily be lifted, and the drilling line would have to be withdrawn through the detached joint. With seventy-five to one hundred twenty-five or more joints it is obvious that an immense amount of time would be wasted in a job of this character. With the present construction, however, the detached section is firmly and in a way permanently connected to the lower end of the casing and remains so connected during the pulling of the casing.

In using the tool, the retainer plates are pressed inwardly after the dogs have been drawn down to the position of Fig. 1 and the lugs 21, by their engagement with the notches 20, hold the dogs in withdrawn position. A split ring 24 is then slipped over the body of the tool in the position shown in Figs. 2 and 4, retaining the retainer plates and the dogs in the position shown. When the tool is lowered into the well casing the ring 24 engages the top of the casing and is shoved up off the body. The well casing, however, holds the dogs in contracted position until the tool is passed below the lower end of the casing. After the casing spear has been engaged with the detached section, the upward movement of the tool into the intact casing will move the dogs down into the position of Fig. 1, that is, the arrangement of the dogs is such that they do not interfere with the upward movement of the tool but lock it against downward movement. It will be noticed that the teeth of the dogs face downwardly.

It will be understood that the improved tool may be used not only for pulling a detached joint or casing but for pulling a lost string of tools. For instance, with a string of tools in a hole that cannot be pulled with a drilling line, a suitable fishing socket will be attached to the bottom of the improved tool, connected to the tools and coupled to the casing. Then the drilling line will be cut to save stripping, and the casing and tools will be pulled at the same time. Much more casing may be pulled in this manner than with the drilling line, and in addition the drilling line may be jarred during pulling. The retaining plates will extend slightly beyond the body at all times, as the body must of necessity be somewhat smaller than the casing. At the instant of disengagement from the mandrel, the retaining plates will be forced outward, but in pulling back up into the casing they will strike the bottom of the casing and be forced into normal inward position.

I claim:

1. A device of the character specified comprising a cylindrical body longitudinally cored from its upper end and having means for connecting the same at each end, said body having cut away portions at opposite sides thereof near its lower end and at the bottom of the cored portion, each of the said cut away portions having an inclined inner face inclining inwardly and downwardly, gripping dogs mounted to slide on the inclined faces and slidably connected with the body, a connection between the dogs, a rod or mandrel mounted to move longitudinally in the cored portion of the body and connected at its lower end to the connection between the dogs, a spring normally pressing said mandrel upwardly to extend the dogs, retaining plates at opposite sides of the mandrel and movable toward and from the mandrel, said plates and mandrel having interengaging means for preventing upward movement of the mandrel under the influence of the spring, said plates being flush with the periphery of the body when interengaged with the mandrel and extending beyond the body when disengaged.

2. A device of the character specified comprising a hollow body having oppositely arranged inclined cam surfaces near its lower end, dogs mounted to slide on the said surfaces for gripping the inner surface of a casing, a spring normally acting to force the dogs upwardly and outwardly into operative position, retaining plates for holding the dogs in lowered inoperative position, and controlled by the spring, said plates being movable radially of the body and having notches, a rod connected with the dogs upon which the spring acts, said rod having cam extensions for engaging the plates.

CLARENCE LAMONT NICHOLS.

Witnesses:
 JERRY CROWLEY,
 GEO. F. STRINGER.